US012750892B2

(12) United States Patent
Feng et al.

(10) Patent No.: US 12,750,892 B2
(45) Date of Patent: Sep. 29, 2026

(54) WIRELESS OFFLOADING FOR POWER-LIMITED DEVICES

(71) Applicant: Synaptics Incorporated, San Jose, CA (US)

(72) Inventors: Shao-Hua Feng, Shanghai (CN); Chun-Guang Wang, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 594 days.

(21) Appl. No.: 18/052,787

(22) Filed: Nov. 4, 2022

(65) Prior Publication Data

US 2024/0155699 A1 May 9, 2024

(51) Int. Cl.
*H04W 52/02* (2009.01)
*H04W 76/10* (2018.01)
*H04W 84/12* (2009.01)

(52) U.S. Cl.
CPC ....... *H04W 76/10* (2018.02); *H04W 52/0209* (2013.01); *H04W 84/12* (2013.01)

(58) Field of Classification Search
CPC . H04W 76/10; H04W 52/0209; H04W 84/12; H04W 76/25; H04W 52/30
See application file for complete search history.

(56) References Cited

U.S. PATENT DOCUMENTS

| | | | | |
|---|---|---|---|---|
| 9,913,216 | B1 * | 3/2018 | Deshpande | H04W 28/14 |
| 11,452,110 | B1 * | 9/2022 | Jorgovanovic | H04W 72/1215 |
| 2018/0091929 | A1 * | 3/2018 | Bi | H04W 28/06 |
| 2021/0410107 | A1 * | 12/2021 | Park | H04W 68/02 |
| 2023/0345361 | A1 * | 10/2023 | Sehgal | H04W 52/0216 |

* cited by examiner

*Primary Examiner* — Joseph E Dean, Jr.
(74) *Attorney, Agent, or Firm* — Paradice & Li LLP

(57) ABSTRACT

Methods and apparatus for offloading wireless connections are disclosed. An example method includes configuring a wireless offload engine to maintain a wireless connection on behalf of one or more circuits coupled to the wireless offload engine, determining that the one or more circuits are to enter a low-power state, and maintaining the wireless connection after the one or more circuits have entered the low-power state based at least in part on the configuring.

14 Claims, 5 Drawing Sheets

WIRELESS OFFLOADING FOR POWER-LIMITED DEVICES

TECHNICAL FIELD

This disclosure relates generally to circuits and techniques for wireless communication, and more particularly to improving power efficiency for wireless communication devices having limited power resources.

BACKGROUND OF RELATED ART

Electronic devices often have limited power availability, such as when power is provided via a battery. For example, internet of things (IoT) devices, such as sensors, cameras, and so on, may be powered by batteries. Such devices may conserve power when not in use by entering a low power state. In some cases, an electronic device may include multiple components, at least one of which may include an integrated circuit, such as a system on chip (SoC) circuit.

Such electronic devices may communicate via wireless connections, such as Wi-Fi connections in accordance with the Institute of Electrical and Electronics Engineers 802.11 series of standards. For example, an electronic device may communicate with one or more remote cloud servers via such a wireless connection.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In some aspects of the present disclosure, methods and apparatus for offloading wireless connections are disclosed. An example method includes configuring a wireless offload engine to maintain a wireless connection on behalf of one or more circuits coupled to the wireless offload engine, determining that the one or more circuits are to enter a low-power state, and maintaining the wireless connection after the one or more circuits have entered the low-power state based at least in part on the configuring.

Another innovative aspect of the present disclosure may be implemented as a wireless offload engine. An example wireless offload engine includes a wireless core configured to exchange wireless signals via one or more networks on behalf of one or more circuits coupled to the wireless offload engine, and a memory coupled to the wireless core. The wireless core is configured to receive one or more files representing instructions for maintaining a wireless connection on behalf of the one or more circuits, determine that the one or more circuits are to enter a low power state, and maintain the wireless connection after the one or more circuits have entered the low power state based at least in part on the instructions.

Another innovative aspect of the present disclosure may be implemented as a non-transitory computer readable storage medium storing instructions for execution by one or more processors of a wireless offload engine. Execution of the instructions causes the wireless offload engine to perform operations including configuring a wireless offload engine to maintain a wireless connection on behalf of one or more circuits coupled to the wireless offload engine, determining that the one or more circuits are to enter a low-power state, and maintaining the wireless connection after the one or more circuits have entered the low-power state based at least in part on the configuring.

BRIEF DESCRIPTION OF THE DRAWINGS

The present embodiments are illustrated by way of example and are not intended to be limited by the figures of the accompanying drawings.

DETAILED DESCRIPTION

Figure 1A:
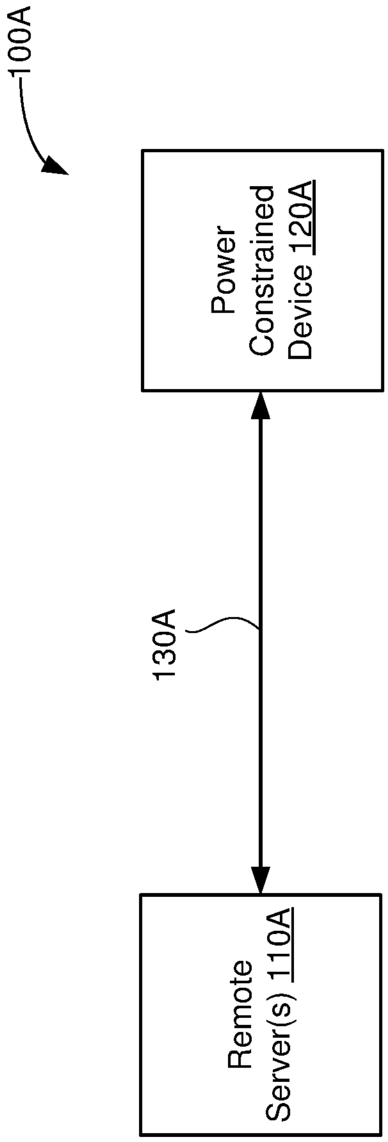
FIG. 1A shows a system for communication between one or more servers and a power constrained device.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present disclosure, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

Various implementations relate generally to a first circuit's performance of wireless connections on behalf of one or more second circuits. For example, a first circuit may maintain a wireless connection on behalf of a second circuit while the second circuit enters a low power state. This may be called "offloading" the wireless connection from the second circuit to the first circuit. Such offloading may be performed by a first circuit, which may be called a wireless offload engine, on behalf of one or more second circuits, such as one or more system on chip (SoC) devices. For example, the one or more second circuits may include devices having limited power availability, such as devices powered by battery, solar power, or similar. The offloaded wireless connection may include wireless connections in accordance with the Institute of Electrical and Electronics Engineers 802.11 series of protocols ("Wi-Fi"). Offloading the wireless connection may enable the first circuit to establish and resume the wireless connection, to perform authentication operations associated with the wireless connection, and so on.

Particular implementations of the subject matter described in this disclosure can be implemented to realize one or more of the following potential advantages. In some implementations, offloading the wireless connection onto the wireless offload engine may allow for the second circuit, such as an SOC, to operate more efficiently while also conserving power. For example, using conventional techniques, when a device, such as an SOC device, enters a low power state, considerable time may be spent exiting the low power state before the device may respond to a request. For example, a conventional SOC may require several seconds, such as between three and five seconds, to exit the low power state, resume its wireless connection, and respond to the request. In contrast, an SOC device incorporating the wireless offload engine described herein may respond to such requests much more quickly, such as within one second, while still allowing the SOC to remain in the low power state until the request is received.

FIG. 1A shows a system 100A for communication between one or more servers and a power constrained device. The system 100A includes one or more remote servers 110A in communication with a power constrained device 120A via one or more networks 130A. For example, the one or more remote servers 110A may include one or more cloud servers, one or more physical servers, or one or more other computing devices capable of performing application or information processing. The power constrained device 120A may include one or more devices capable of communicating with the one or more remote servers 110A. For example, the power constrained device 120A may be an internet of things (IoT) device capable of responding to requests from the one or more remote servers 110A, such as an IoT device capable of capturing images, video, or other data and providing such data to the one or more remote servers 110A in response to such requests. The power constrained device 120A may have limited power resources, for example due to operating using battery power, solar power, or other limited power resources. The one or more networks 130A may include one or more wireless networks, one or more wired networks, one or more intermediate servers, relays, or network nodes via which the remote servers 110A may communicate with the power constrained device 120A. For example, the power constrained device 120A may be capable of wireless communication, such as using a Wi-Fi communication protocol, using a cellular communication protocol, or similar.

Figure 1B:
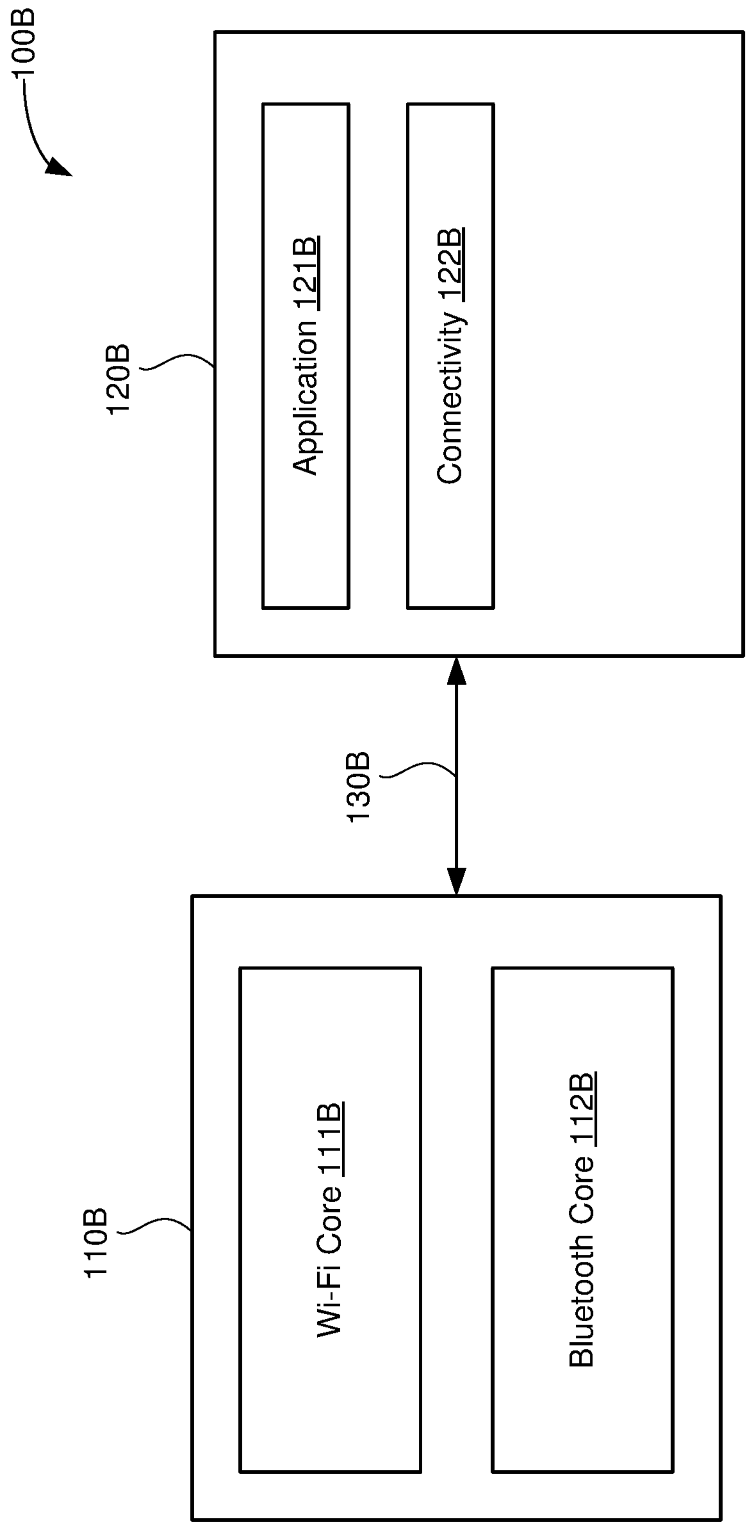
FIG. 1B shows a block diagram of a conventional power constrained device.

FIG. 1B shows a block diagram of a conventional power constrained device 100B. The conventional power constrained device 100B may be an example of the power constrained device 120A of FIG. 1A. More particularly, the conventional power constrained device 100B is shown to include a communication circuit 110B and an application circuit 120B, which may be coupled via one or more communication links 130B. The communication circuit 110B may include a Wi-Fi core 111B and a Bluetooth core 112B. The Wi-Fi core 111B may perform basic functions relating to communication using Wi-Fi. For example, the Wi-Fi core 111B may communicate with one or more remote servers, such as remote servers 110A via a Wi-Fi communication protocol. Note that in some communication circuits, the Wi-Fi core 111B may be replaced or augmented by one or more circuits capable of performing basic wireless communication functions relating to another protocol, such as a cellular communication protocol, or similar. The Bluetooth core may communicate with one or more devices proximate to the conventional power constrained device 100B using a Bluetooth communication protocol.

While the communication circuit 110B may perform only basic wireless communication functions, the application circuit 120B may perform functions relating to the core functionality of the conventional power constrained device 100B. For example, when the conventional power constrained device 100B is an IoT device capable of capturing images or video, the application circuit 120B may include the camera(s) and logic for capturing such images or video, generating frames for communication to one or more remote servers in response to requests, and so on. The application circuit 120B may include a system on chip (SoC), an application-specific integrated circuit (ASIC), or another programmable logic device.

The application circuit 120B may be coupled to the communication circuit 110B via one or more data connections 130B. For example, the data connections 130B may include one or more connections interfaces such as a secure digital input output (SDIO) interface, one or more serial interfaces such as a universal asynchronous receiver-transmitter (UART) interface, and so on.

The application circuit 120B may include an application module 121B and a connectivity module 122B. The application module 121B may include one or more files or applications for performing the one or more core functionality of the conventional power constrained device 100B. The connectivity module 122B may include software or hardware for establishing, maintaining, and communicating with one or more remote servers using the basic wireless functionality provided by the communication circuit 110B. For example, the connectivity module 122B may implement a set of communication protocols for communicating with the one or more remote servers. For example, the set of communication protocols may include an Internet protocol suite, which may also be referred to as a transmission control protocol/Internet protocol (TCP/IP) stack. The connectivity module 122B may generate packets for transmission to the one or more remote servers, process packets received from the one or more remote servers for interpretation and use by the application circuit 120B, and so on. The connectivity module 122B may also establish and maintain wireless connections with the one or more remote servers, for example performing one or more handshake operations, authentication operations, and so on.

Power constrained devices, such as the conventional power constrained device 100B, may typically enter a low power state when not in use, so as to conserve power. For conventional power constrained devices, such as the conventional power constrained device 100B depicted in FIG. 1B, resuming operations after entering such a low power state may require several seconds. For example, when a conventional power constrained device enters the low power state, its wireless connections with remote servers are closed, and must be resumed when exiting the low power state. This may be seen in the conventional power constrained device 100B by the presence of the connectivity module 122B in the application circuit 120B. When the application circuit 120B enters the low power state, the connectivity module 122B cannot maintain wireless connections, and they must be resumed upon exiting the low power state. Thus, the connection, handshake, authentication, and other operations associated with resuming the wireless connection must be performed before the power constrained device may respond to requests received from the remote servers. This may require several seconds, such as between three and five seconds in some cases. Such delays may be undesirable, particularly when prompt response is important. For example, when the power constrained device is an IoT device incorporating a camera, such as a security camera, a doorbell camera, or similar, a remote server may request data including visual or video data. It may be important for response to be prompt so that the visual or video data provided in response to the request is accurate and up to date. It would therefore be desirable to reduce the time required for a power constrained device in a low power state to exit the low power state and respond to requests from remote servers.

In accordance with the example implementations, a wireless offload engine may be configured to establish and maintain one or more wireless connections on behalf of an application circuit of a power constrained device. For example, the application circuit may be an SoC, an ASIC, or another programmable logic device which may enter a low power state. During the low power state, the wireless offload engine may maintain the one or more wireless connections. Thus, when a remote server transmits a request to the power constrained device while the application circuit is in the low power state, delays associated with reestablishing the wireless connections may be avoided, resulting in significantly reduced times required for responding to the request. Similarly, if a maintained wireless connection is interrupted while the application circuit is in the low power state, the wireless offload engine may reestablish the wireless connection without waking the application circuit, for example performing one or more handshake operations, one or more authentication operations, and so on.

Figure 2:
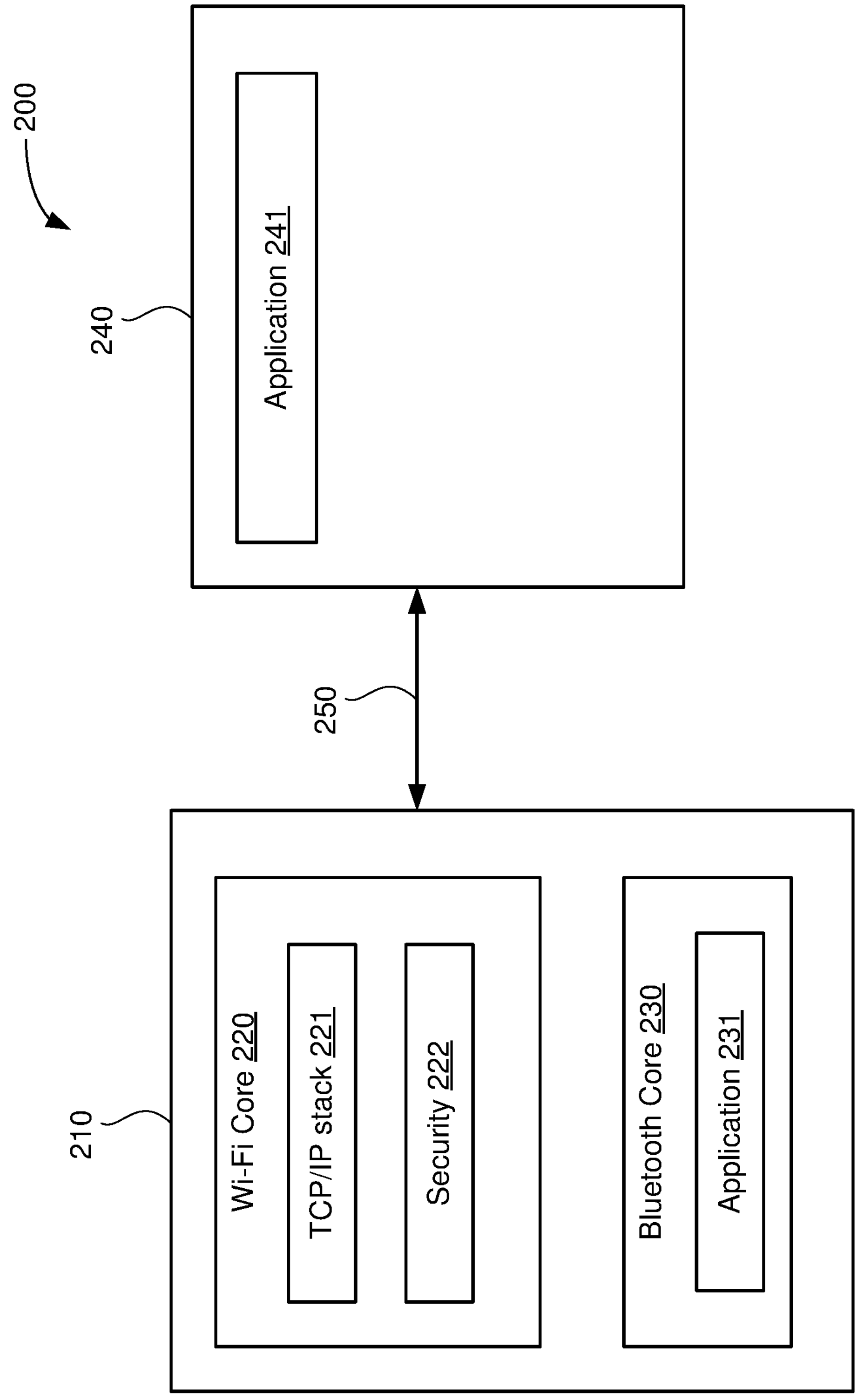
FIG. 2 shows an example power constrained device, in accordance with some implementations.

FIG. 2 shows an example power constrained device 200, in accordance with some implementations. The power constrained device 200 includes a wireless offload engine 210 including a Wi-Fi core 220 and a Bluetooth core 230. The wireless offload engine 210 is coupled to an application circuit 240 via one or more data connections 250. The one or more data connections 250 may include one or more connections interfaces for coupling the wireless offload engine 210 to the application circuit 240. For example, the data connections 250 may include an SDIO interface, one or more serial interfaces such as a UART interface, and so on.

The Wi-Fi core 220 of the wireless offload engine 210 includes a TCP/IP stack 221 and a security module 222. The TCP/IP stack 221 may be a lightweight IP (IwIP) stack. The security module 222 may perform one or more security functions relating to the establishing and maintenance of wireless connections. More particularly, the security module 222 may perform one or more handshake operations, authentication operations, and so on associated with the establishment and maintenance of wireless connections. Note that in some aspects, the Wi-Fi core 220 may be replaced or augmented by one or more circuits capable of performing basic wireless communication functions relating to another wireless communication protocol, such as a cellular communication protocol, or similar.

The wireless offload engine 210 also includes a Bluetooth core 230 configured to perform basic Bluetooth connectivity and communication functions of the power constrained device 200. In some aspects, the Bluetooth core 230 may include an application module 231. As discussed in more detail below, the application module 231 corresponds to one or more files or applications of the application circuit 240. In some aspects, rather than being contained within memory of the Bluetooth core 230, the application module 231 may be stored in another memory of the wireless offload engine 210.

The power constrained device 200 also includes an application circuit 240. For example, when the power constrained device 200 is an IoT device capable of capturing images or video, the application circuit 240 may include the camera(s) and logic for capturing such images or video, generating frames for communication to one or more remote servers in response to requests, and so on. The application circuit 240 may include a system on chip (SoC), an application-specific integrated circuit (ASIC), or another programmable logic device. The application circuit 240 may include an application module 241. The application module 241 may include one or more files or applications for performing the one or more core functionality of the power constrained device 200.

In contrast to the conventional power constrained device 100B, the power constrained device 200 includes the TCP/IP stack 221 and the security module 222 in the wireless offload engine 210. That is, while in the conventional power constrained device 100B the connectivity module 122B of the application circuit 120B was configured to establish and maintain wireless connections to remote servers, the Wi-Fi core 220 of the power constrained device 200 contains the TCP/IP stack 221 and the security module 222 for establishing and maintaining such wireless connections. Further, the wireless offload engine 210 includes the application module 231, which corresponds to the application module 241. More particularly, the application module 231 may be configured to perform one or more functions, such as handshake functions, authentication and other security functions, and so on, associated with establishing and maintaining one or more wireless connections associated with the application module 241. For example, the application module 231 may be configured to perform such functions using the Wi-Fi core 220, such as by using one or more of the TCP/IP stack 221 and the security module 222 of the Wi-Fi core 220.

Note that while the application module 231 may correspond to the application module 241, that the application module 231 may be simpler, smaller in size, and capable of fewer functions than the application module 241. For example, the application module 231 may be capable of only a subset of the operations supported by the application module 241. For example, when the power constrained device 200 is an IoT device including one or more cameras, the application module 241 may support operations for capturing images or video and otherwise configuring the cameras, while the application module 231 may only support operations relating to establishment and maintenance of wireless connections with remote servers capable of requesting such images or video.

Prior to the application circuit 240 entering the low power state, the wireless offload engine 210 may be configured to establish or maintain the one or more wireless connections. Such configuration may include providing the wireless offload engine 210 with information detailing the wireless connections to be established and maintained, and the identifies and configurations of the remote server or servers associated with such wireless connections. For example, the wireless offload engine 210 may receive one or more applications or other files including such details, and including instructions for establishing the wireless connections, performing any required handshake or authentication operations, formation and interpretation details for requests from and responses to the one or more remote servers, and so on. In some aspects, this configuration may include providing one or more applications or other files to be stored in the wireless offload engine 210, such as the application module 231. In some aspects, this configuring may be performed using one or more public or private application programming interfaces (APIs).

After the wireless offload engine 210 has been configured to maintain the one or more wireless connections on behalf of the application circuit 240, the application circuit 240 may enter a low power state in order to conserve power. For example, the application module 241 may send an indication or otherwise signal the wireless offload engine 210 that the application circuit 240 is to enter the low power state. While the application circuit 240 is in the low power state, the wireless offload engine 210 may maintain the one or more wireless connections on behalf of the application circuit 240, such as by transmitting one or more frames to the remote servers via the maintained wireless connections. Such frames may be configured to keep the wireless connection alive, and may be a TCP keepalive message, or another message configured to prevent the wireless connections from being broken or to verify that the link between the power constrained device 200 and the remote servers is functioning.

For some connections with remote servers, such as connections with some cloud servers, establishing a connection may include security functions such as handshake functions (e.g., a TCP handshake or similar), authentication functions, and so on. Configuring the wireless offload engine 210 to maintain the one or more wireless connections on behalf of the application circuit 240 may also include configuring the wireless offload engine to establish or reestablish wireless connections by performing such security functions. For example, when a conventional power constrained device enters a low power state, wireless connections may be terminated, or such wireless connections may otherwise time out, or otherwise be terminated for inactivity. In some aspects, the wireless offload engine 210 may receive a TCP/IP connection termination message, which may also be called a TCP/IP finish or "FIN" message to indicate the termination of a wireless connection. Example power constrained devices including a wireless offload engine, such as the wireless offload engine 210, may avoid the significant delays associated with reestablishing such connections. More particularly, the application module 231 may be configured to perform the functions required for reestablishing the connection with the remote server, such as the handshake functions and the authentication functions. As a consequence, terminated connections with remote servers may be reestablished while allowing the application circuit 240 to remain in the low power state.

Additionally, while the application circuit 240 is in the low power state, requests may be transmitted to the power constrained device 200 via the maintained wireless connections, such as requests for data. When the power constrained device 200 includes at least one camera, such requests may request transmission of one or more videos or images. For example, when the power constrained device 200 is an IoT device such as an IoT doorbell or security camera, a user may request transmission of such image or video data. Because the wireless offload engine 210 is configured to maintain the wireless devices, the power constrained device 200 may respond to such requests considerably more quickly than using conventional techniques. For example, the wireless offload engine 210 may receive a request from a remote server via a maintained wireless connection and verify that the request is a valid request. For example, the application module 231 may be configured to verify the validity of such requests. If the request is not a valid request, then the application circuit 240 may remain in the low power state. If the wireless offload engine 210 determines that the request is a valid request, for example by the application module 231 determining that the request is a valid request, the application circuit 240 may be instructed to exit the low power state. The request may then be provided to the application module 241, which may direct the application circuit 240 to determine an appropriate response to the request, such as including data from a memory coupled to the application circuit 240, or with images or video data captured by one or more cameras coupled to the application circuit 240. The application module 241 may provide responsive data to the wireless offload engine 210, and the wireless offload engine 210 may transmit the responsive data to the remote server.

Figure 3:
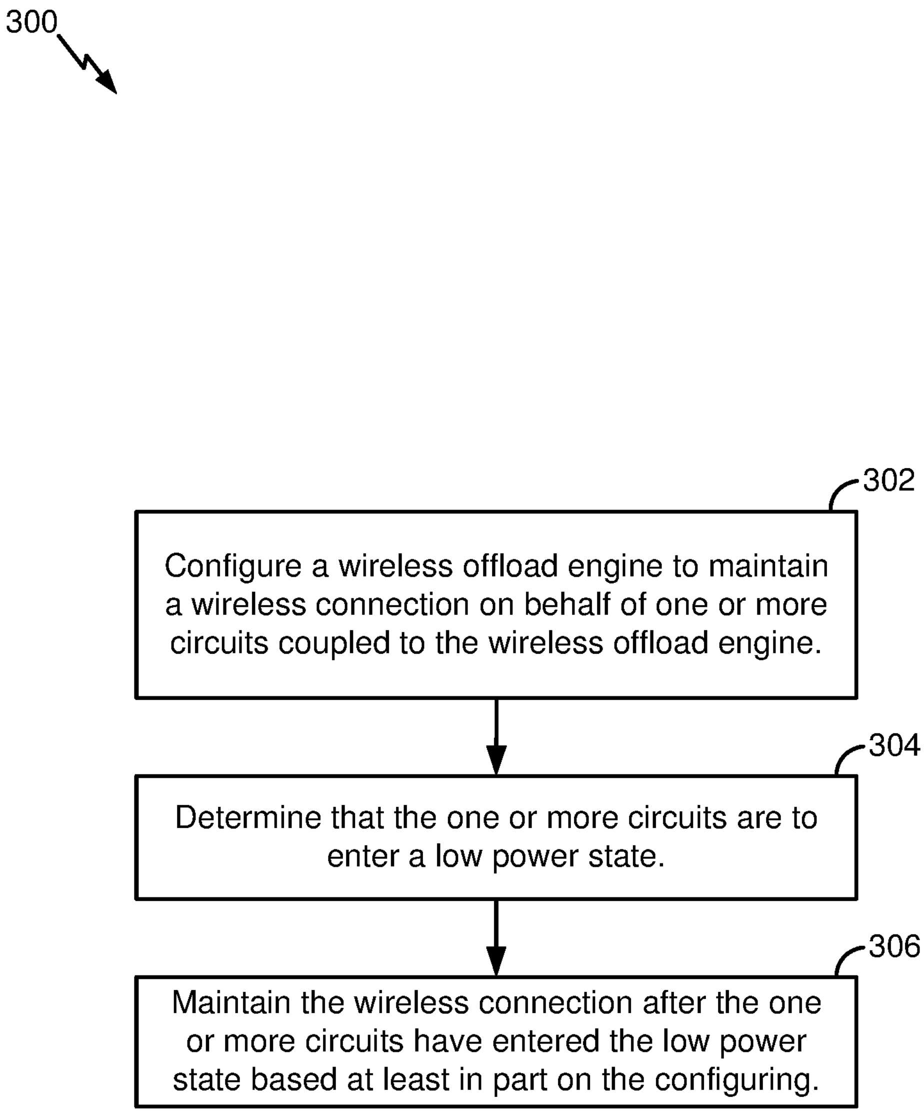
FIG. 3 shows a flowchart illustrating an example process that supports wireless communication according to some implementations.

FIG. 3 shows a flowchart illustrating an example process 300 that supports wireless communication according to some implementations. The operations of the process 300 may be implemented by a power constrained device such as the power constrained device 200 described above with reference to FIG. 2. The power constrained device includes a wireless offload engine such as the wireless offload engine 210 of FIG. 2. In some implementations, the power constrained device may be an IoT device or another device operating with limited power resources, such as battery or solar power sources.

In some implementations, in block 302, the power constrained device configures the wireless offload engine to maintain a wireless connection on behalf of one or more circuits coupled to the wireless offload engine. In some aspects, the wireless offload engine is configured to maintain the wireless connection in block 302 by establishing the wireless connection on behalf of the one or more circuits. In some aspects, the wireless offload engine is configured to maintain the wireless connection in block 302 by performing one or more authentication operations with one or more cloud servers on behalf of the one or more circuits. In some aspects, the wireless offload engine is configured to maintain the wireless connection in block 302 by receiving one or more files from the one or more circuits, where the one or more files correspond to the wireless connection. In some aspects, the one or more files correspond to an application configured to communicate via the wireless connection. In some aspects, the process 300 further includes storing the one or more files in a local storage coupled to the wireless offload engine. In some aspects, the local storage includes a Bluetooth core coupled to the wireless offload engine. In some aspects, the wireless offload engine includes a Wi-Fi core, the Wi-Fi core including a lightweight internet protocol (lwIP) stack, wherein configuring the wireless offload engine in block 302 includes configuring the lwIP stack to maintain the wireless connection by performing one or more Transmission Control Protocol/Internet Protocol (TCP/IP) handshake operations to maintain the wireless connection.

In block 304, the power constrained device determines that the one or more circuits are to enter a low power state.

In block 306, the wireless offload engine maintains the wireless connection after the one or more circuits have entered the low power state based at least in part on the configuring.

In some aspects, the process 300 further includes receiving a request for data via the maintained wireless connection, determining, based on the configuring, that the request is valid, exiting the low power state at the one or more circuits, and responding to the request with the requested data. In some aspects, responding to the request with the requested data includes capturing one or more images and responding to the request with the captured one or more images. In some aspects, the process 300 further includes entering the low power state at the one or more circuits after responding to the request with the requested data.

Figure 4:
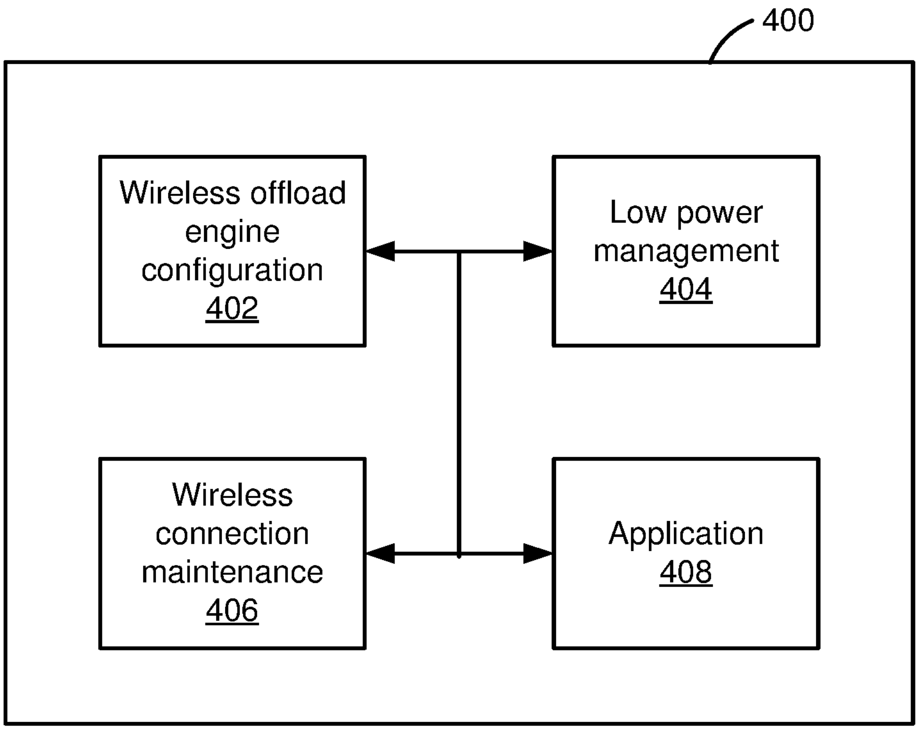
FIG. 4 shows a block diagram of an example power constrained device that supports wireless communication according to some implementations.

FIG. 4 shows a block diagram of an example power constrained device 400 that supports wireless communication according to some implementations. In some implementations, the power constrained device 400 is configured to perform the process 300 described above with reference to FIG. 3. The power constrained device 400 may be an example implementation of the power constrained device 200 described above with reference to FIG. 2. For example, the power constrained device 400 can include a wireless offload engine 210, and an application circuit 240. The wireless offload engine 210 and the application circuit 240 may each be a chip, SoC, chipset, package or device that includes at least one processor, at least one modem (for example, a Wi-Fi (IEEE 802.11) modem or a cellular modem), at least one memory, and at least one radio.

The power constrained device 400 includes a wireless offload engine configuration component 402, a low power management component 404, a wireless connection maintenance component 406, and an application component 408. Portions of one or more of the components 402, 404, 406, and 408 may be implemented at least in part in hardware or firmware. For example, the wireless offload engine configuration component 404 may be implemented at least in part by the application circuit 240, for example using an API associated with the application module 241. In some implementations, at least some of the components 402, 404, 406, and 408 are implemented at least in part as software stored in a memory. For example, portions of one or more of the components 402, 404, 406, and 408 can be implemented as non-transitory instructions (or "code") executable by a processor to perform the functions or operations of the respective module.

The wireless offload engine configuration component 402 is configured to configure the wireless offload engine to maintain one or more wireless connections with remote servers on behalf of circuits coupled to the wireless offload engine, for example, as discussed with respect to block 302 of FIG. 3.

The low power management component 404 is configured to cause one or more circuits, such as the application circuit 240, to enter or exit a low power state.

The wireless connection maintenance component 406 is configured to maintain one or more wireless connections on behalf of the one or more circuits, based on the configuration of the wireless offload engine, for example as discussed with respect to block 306 of FIG. 3.

The application component 408 is configured to establish and maintain wireless connections with remote servers, and to respond to requests for data from the remote servers, for example responding to such requests with images or video captured at the power constrained device.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for wireless communication, comprising:

configuring a wireless offload engine to maintain a wireless connection with a remote server on behalf of one or more circuits coupled to the wireless offload engine, the wireless offload engine comprising:

a Bluetooth core configured to perform Bluetooth connectivity functions and store one or more files associated with the one or more circuits, the one or more files including instructions for performing one or more authentication operations; and a Wi-Fi core configured to maintain the wireless connection with the remote server based at least in part on the one or more files;

determining that the one or more circuits are to enter a low-power state; and maintaining the wireless connection with the remote server after the one or more circuits have entered the low-power state based at least in part on performing at least one of the one or more authentication operations using the instructions included in the one or more files stored by the Bluetooth core.

2. The method of claim 1, wherein the configuring comprises configuring the wireless offload engine to establish the wireless connection on behalf of the one or more circuits.

3. The method of claim 1, wherein the Wi-Fi core comprises a lightweight internet protocol (lwIP) stack, wherein configuring the wireless offload engine comprises configuring the lwIP stack to maintain the wireless connection by performing one or more Transmission Control Protocol/Internet Protocol (TCP/IP) handshake operations to maintain the wireless connection.

4. The method of claim 1, wherein the configuring comprises receiving the one or more files from the one or more circuits, the one or more files corresponding to the wireless connection.

5. The method of claim 4, wherein the one or more files correspond to an application configured to communicate via the wireless connection.

6. The method of claim 1, further comprising:

receiving a request for data via the maintained wireless connection;

determining, based at least on part on the one or more files, that the request is valid;

directing the one or more circuits to exit the low-power state; and responding to the request with the requested data.

7. The method of claim 6, wherein responding to the request comprises capturing one or more images and responding to the request with the captured one or more images.

8. The method of claim 6, further comprising entering the low-power state at the one or more circuits after responding to the request with the requested data.

9. A wireless offload engine, comprising:

a wireless core configured to exchange wireless signals via one or more networks on behalf of one or more circuits coupled to the wireless offload engine, the wireless core comprising:

a Bluetooth core configured to perform Bluetooth connectivity functions and store one or more files associated with the one or more circuits, the one or more files including instructions for performing one or more authentication operations; and a Wi-Fi core configured to maintain a wireless connection with a remote server based at least in part on the one or more files stored in the Bluetooth core; and a memory coupled to the wireless core;

wherein the wireless core is configured to:

receive the one or more files, the one or more files including instructions for performing one or more authentication operations for maintaining the wireless connection with the remote server on behalf of the one or more circuits;

determine that the one or more circuits are to enter a low-power state; and maintain the wireless connection with the remote server after the one or more circuits have entered the low-power state based at least in part on performing at least one of the one or more authentication operations in the instructions.

10. The wireless offload engine of claim 9, wherein the instructions comprise instructions for establishing the wireless connection on behalf of the one or more circuits.

11. The wireless offload engine of claim 9, wherein the Wi-Fi core comprises a lightweight internet protocol (lwIP) stack, wherein the instructions configure the lwIP stack to maintain the wireless connection by performing one or more Transmission Control Protocol/Internet Protocol (TCP/IP) handshake operations to maintain the wireless connection.

12. The wireless offload engine of claim 9, wherein the wireless core is configured to:

receive a request for data via the maintained wireless connection;

determine, based at least in part on the instructions, that the request is valid;

direct the one or more circuits to exit the low-power state; and respond to the request with the requested data.

13. The wireless offload engine of claim 12, wherein the one or more circuits are further configured to enter the low-power state after responding to the request with the requested data.

14. A non-transitory computer readable storage medium storing instructions for execution by one or more processors of a wireless offload engine, wherein execution of the instructions causes the wireless offload engine to perform operations comprising:

configuring a wireless offload engine to maintain a wireless connection with a remote server on behalf of one or more circuits coupled to the wireless offload engine, the wireless offload engine comprising:

a Bluetooth core configured to perform Bluetooth connectivity functions and store one or more files associated with the one or more circuits, the one or more files including instructions for performing one or more authentication operations; and a Wi-Fi core configured to maintain the wireless connection with the remote server based at least in part on the one or more files;

determining that the one or more circuits are to enter a low-power state; and maintaining the wireless connection with the remote server after the one or more circuits have entered the low-power state based at least in part on performing at least one of the one or more authentication operations using the instructions included in the one or more files stored by the Bluetooth core.

* * * * *